(12) United States Patent
Feng et al.

(10) Patent No.: US 9,304,630 B2
(45) Date of Patent: Apr. 5, 2016

(54) TOUCH PANEL (75) Inventors: Chen Feng, Beijing (CN); Li Qian, Beijing (CN); Liang Liu, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 1561 days.

(21) Appl. No.: 12/903,546

(22) Filed: Oct. 13, 2010

(65) Prior Publication Data

US 2011/0304579 A1    Dec. 15, 2011

(30) Foreign Application Priority Data

Jun. 11, 2010  (CN) .......................... 2010 1 0198630

(51) Int. Cl.
*G06F 3/045* (2006.01)
*G06F 3/044* (2006.01)

(52) U.S. Cl.
CPC ................ *G06F 3/044* (2013.01); *G06F 3/045* (2013.01); *G06F 2203/04106* (2013.01)

(58) Field of Classification Search
CPC ........... G06F 3/041–3/47; G06F 3/045; G06F 2203/04106; G06F 2203/04113
See application file for complete search history.

(56) References Cited

U.S. PATENT DOCUMENTS

| 8,115,744 | B2 * | 2/2012 | Kong et al. | ................... 345/173 |
| 2008/0192014 | A1 * | 8/2008 | Kent et al. | ..................... 345/173 |
| 2009/0153512 | A1 | 6/2009 | Jiang et al. | |
| 2009/0189875 | A1 * | 7/2009 | Ma | ................ 345/174 |
| 2010/0093247 | A1 * | 4/2010 | Jiang et al. | ...................... 445/24 |
| 2011/0007026 | A1 * | 1/2011 | Chen et al. | .................... 345/174 |

FOREIGN PATENT DOCUMENTS

| CN | 101498982 | 8/2009 |
| CN | 101620492 | 1/2010 |
| EP | 2085861 | 8/2009 |
| TW | 200929638 | 7/2009 |
| TW | 200941325 | 10/2009 |
| TW | 201015415 | 4/2010 |

* cited by examiner

*Primary Examiner* — Matthew Sim
(74) *Attorney, Agent, or Firm* — Novak Druce Connolly Bove + Quigg LLP (57) ABSTRACT

A touch panel includes a first electrode plate, a second electrode plate, and a capacitive detector. The first electrode plate includes a first transparent conductive layer. The second electrode plate includes a second transparent conductive layer opposite to and spaced from the first transparent conductive layer. The second transparent conductive layer is a conductive film having different resistance along different directions. The capacitive detector is electrically connected with the first electrode plate.

10 Claims, 7 Drawing Sheets

TOUCH PANEL

RELATED APPLICATIONS

This application claims all benefits accruing under 35 U.S.C. §119 from China Patent Application No. 201010198630.6, filed on Jun. 1, 2010, in the China Intellectual Property Office, the disclosure of which is incorporated herein by reference.

BACKGROUND

1. Technical Field

The disclosure relates to touch panels and, particularly, to a carbon nanotube-based touch panel.

2. Description of Related Art

Various electronic apparatuses such as mobile phones, car navigation systems, and the like, are equipped with optically transparent touch panels applied over display devices such as liquid crystal panels. The electronic apparatus is operated when contact is made with the touch panel corresponding to elements appearing on the display device. A demand thus exists for such touch panels to maximize visibility and reliability in operation.

A resistive touch panel often includes two layers of transparent conductive layers positioned apart from each other by a plurality of spacers. If one user presses the touch panel with a finger, pressure from the touch will cause the two transparent conductive layers to electrically contact each other at the pressing point, and the location of the pressing point can be calculated. The resistive touch panel has high definition and a long lifetime. However, the resistive touch panel cannot detect capacitive signals and cannot detect the touching signals until the pressure at the pressing point is great enough to force the two transparent conductive layers to contact each other. As such, the resistive touch panel has a slow reaction speed and low sensitivity.

What is needed, therefore, is a touch panel that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
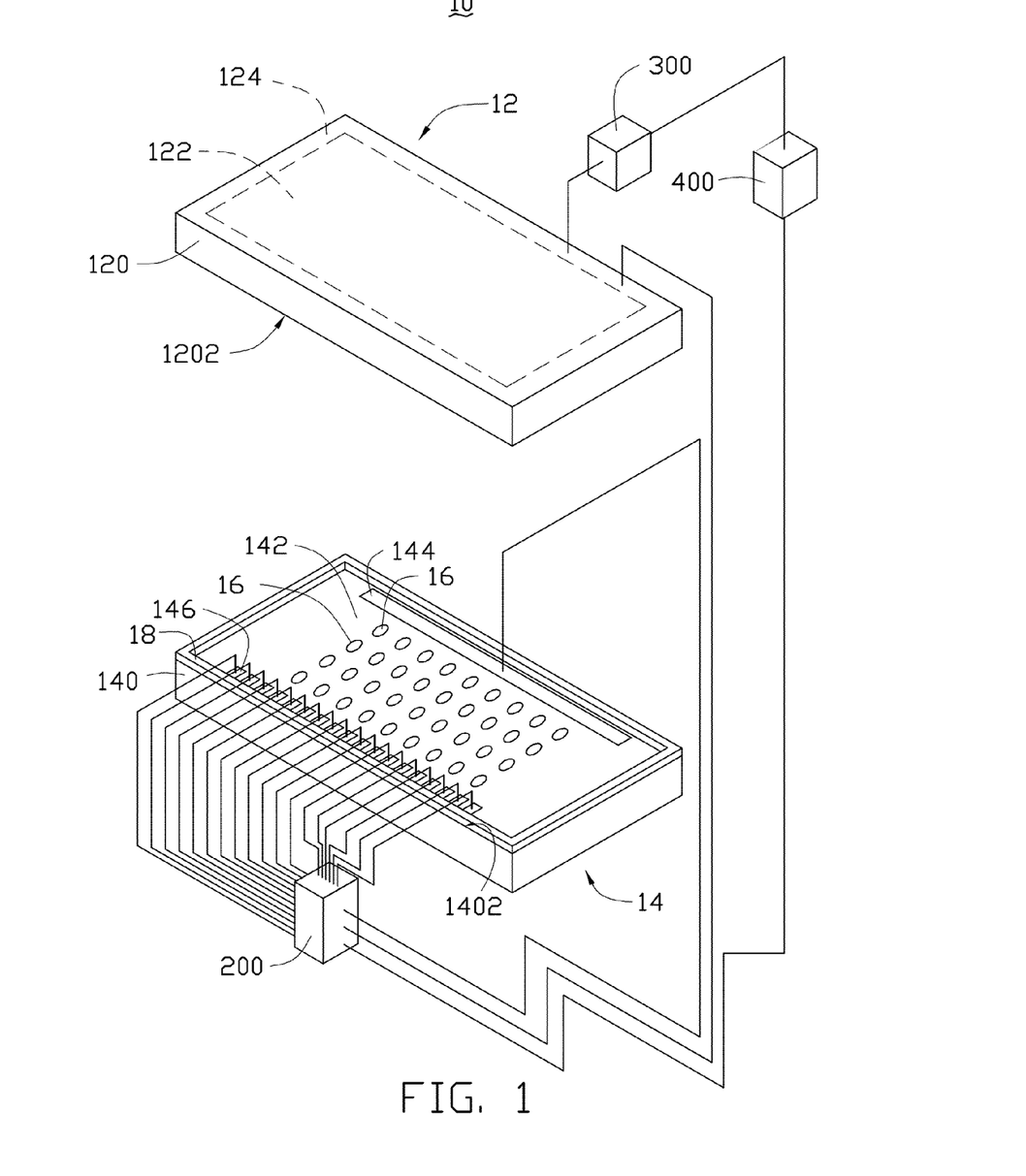
FIG. 1 is an exploded, isometric view of an embodiment of a touch panel.
Figure 2:
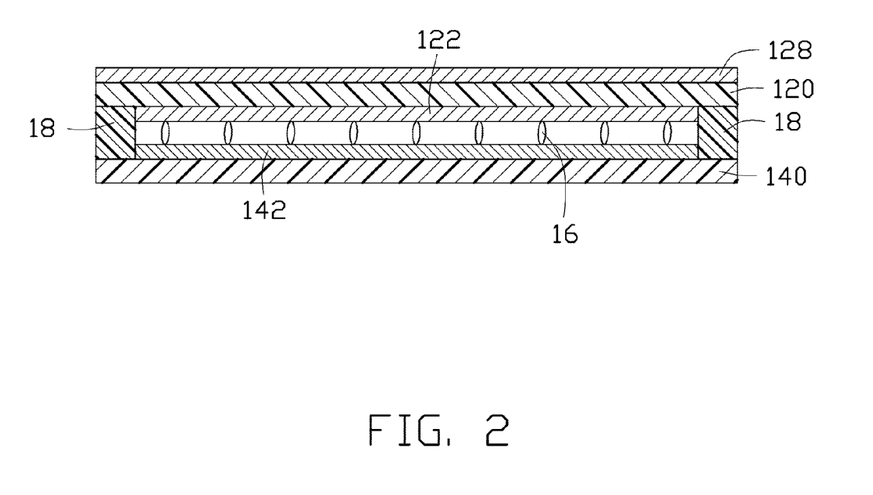
FIG. 2 is a transverse cross-sectional view of the touch panel of FIG. 1.

Referring to FIG. 1 and FIG. 2, one embodiment of a touch panel 10 comprises a first electrode plate 12, a second electrode plate 14, a plurality of transparent dot spacers 16, a resistive touch panel detector 200, a capacitive detector 300, and a processor 400. The resistive touch panel detector 200 is electrically connected to the first electrode plate 12 and the second electrode plate 14. The capacitive detector 300 and the resistive touch panel detector 200 are selected to perform work in response to force applied on the first electrode plate 12. The resistive touch panel detector 200 responds to voltage changes between the first electrode plate 12 and the second electrode plate 14. The capacitive detector 300 is electrically connected to the first electrode plate 12 and detects a change in capacitance between the first electrode plate 12 and a touching object. The resistive touch panel detector 200 and the capacitive detector 300 are both integrated in the processor 400.

Figure 3:
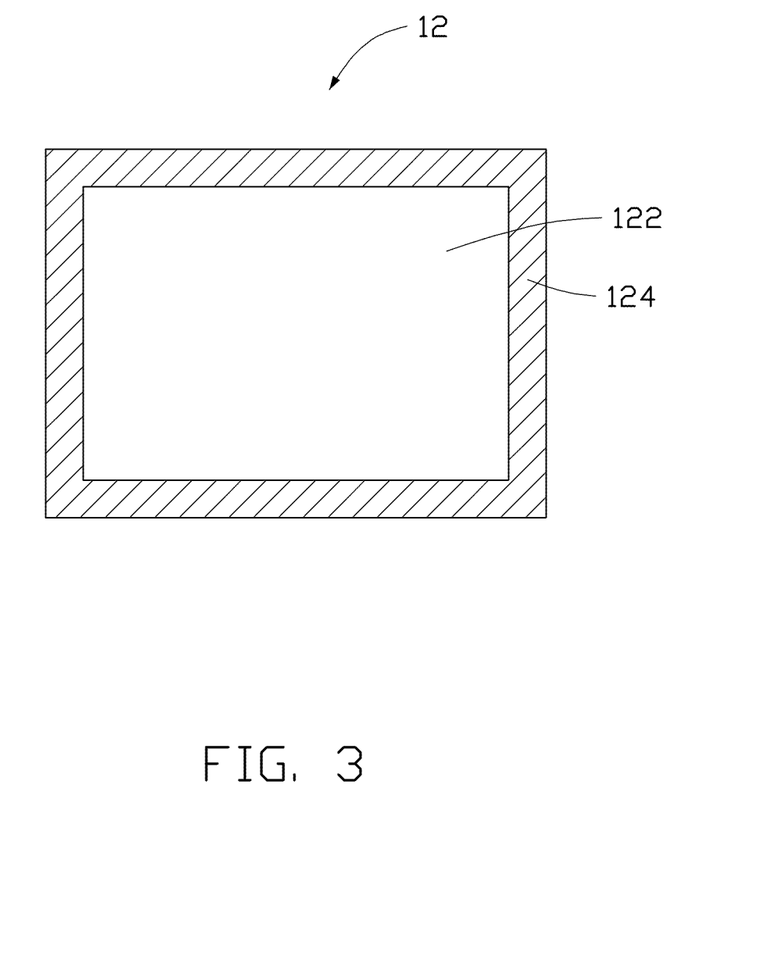
FIG. 3 is a schematic view of a first electrode plate used in the touch panel of FIG. 1.

Referring also to FIG. 3, the first electrode plate 12 includes a first substrate 120, a first transparent conductive layer 122, and a first electrode 124. The first substrate 120 includes a first surface 1202 facing and spaced from the second electrode plate 14. The first transparent conductive layer 122 is located at the first surface 1202 of the substrate 120. The first electrode 124 is electrically connected with the first transparent layer 122. The first electrode 124 surrounds and contacts the first transparent conductive layer 122. In one embodiment illustrated in FIG. 3, the first electrode 124 is located on a surface of the first transparent conductive layer 122 and symmetrically aligned with four sides of the first conductive layer 122. The first electrode 124 is electrically connected to the capacitive detector 300 and the resistive touch panel detector 200. In one embodiment, the first electrode 124 is an ITO film.

Figure 4:
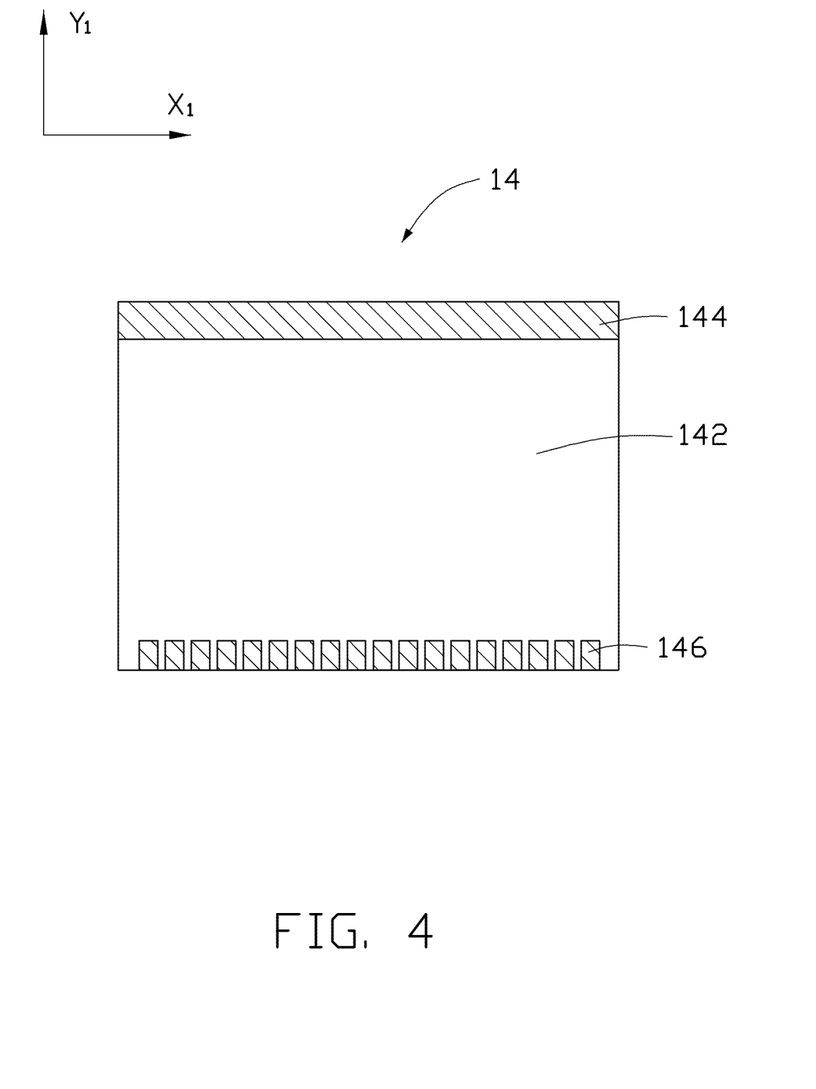
FIG. 4 is a schematic view of a second electrode plate used in the touch panel of FIG. 1.

The second electrode plate 14 includes a second substrate 140, a second transparent conductive layer 142, a second electrode 144, and a plurality of detecting electrodes 146. The second substrate 140 includes a second surface 1402 facing and spaced from the first electrode plate 12. The second transparent conductive layer 142 is positioned on the second surface 1402 and faces the first transparent conductive layer 122. The second electrode 144 and the detecting electrodes 146 are electrically connected to the second transparent conductive layer 142. The second electrode 144 is located at one end of the second transparent conductive layer 142, the detecting electrodes 146 are located at another end of the second transparent conductive layer 142 opposite to the second electrode 144. The second electrode 144 is oriented along a first direction $X_1$ as shown in FIG. 4. The detecting electrodes 146 are arranged along the first direction $X_1$. A distance between two adjacent detecting electrodes 146 can be uniform, and in a range from about 1 micrometer to about 100 micrometers. A second direction $Y_1$ perpendicular to the first direction is shown in FIG. 4. The second electrode 144 is electrically connected to the resistive touch panel detector 200. The detecting electrodes 146 are electrically connected to the resistive touch panel detector 200.

An insulative layer 18 is further provided between the first and second substrates 120, 140. In one embodiment, the insulative layer 18 is in the form of a rectangular bead. The first electrode plate 12 is located on the insulative layer 18. That is, the first conductive layer 122 faces, but is spaced from, the second conductive layer 142. The dot spacers 16 are located on the second conductive layer 142. A distance between the second electrode plate 14 and the first electrode plate 12 is typically in an approximate range from 2 to 10 microns. The insulative layer 18 and the dot spacers 16 are made of, for example, insulative resin or any other suitable insulative material. Electrical insulation between the first electrode plate 12 and the second electrode plate 14 is provided by the insulative layer 18 and the dot spacers 16. It is to be understood that the dot spacers 16 are optional, particularly if the size of the touch panel 10 is relatively small.

In one embodiment, a transparent protective film 128 is located on the upper surface of the first electrode plate 12. The material of the transparent protective film 128 can be silicon nitrides, silicon dioxides, benzocyclobutenes, polyester films, or polyethylene terephthalates. For example, the transparent protective film 128 can be made of slick plastic and receive a surface hardening treatment to protect the first electrode plate 12 from being scratched when in use.

The first substrate 120 is a transparent and flexible film/plate made of polymer, resin, or any other flexible material. The second substrate 140 is a transparent board made of glass, diamond, quartz, plastic or any other suitable material. The second substrate 140 can be made of a flexible material. The flexible material can be polycarbonate (PC), polymethyl methacrylate acrylic (PMMA), polyethylene terephthalate (PET), polyethersulfones (PES), polyvinylchloride (PVC), benzocyclobutenes (BCB), polyesters, or acrylic resins. The thickness of each of the first substrate 120 and the second substrate 140 can range from about 1 mm to about 1 cm. In one embodiment, the first substrate 120 and the second substrate 140 are made of PET, and each have a thickness of about 2 mm.

The first electrode 142, the second electrode 144 and the plurality of detecting electrodes 146 are made of conductive material, such as metal, alloy, or indium tin oxide (ITO). The shapes of the first electrode 142 and the second electrode 144 can be linear, such as wire-shaped or bar-shaped. The shape of each detecting electrode 146 can be block shaped. The cross sectional shape of the first electrode 142 and the second electrode 144 can be round, square, trapezium, triangular, or polygonal. The thickness of the first electrode 142, the second electrode 144 and the detecting electrode 146 can be any size, depending on the design, and can be about 1 micrometer to about 5 millimeters. In one embodiment, the first electrode 142 and the second electrode 144 are both silver wires made by a screen print method, and the detecting electrodes 146 are silver spots made by a screen print method.

The first transparent conductive layer 122 can be an ITO layer or an antimony tin oxide (ATO) layer.

The second transparent conductive layer 142 can be a conductive film having different resistance along different directions, e.g., the resistivity of the second transparent conductive layer 142 in two-dimensional space is different. Referring to FIG. 4, the resistivity of the second transparent conductive layer 142 along the first direction $X_1$ indicated by $\rho_x$ is larger than the resistivity of the second transparent conductive layer 142 along the second direction $Y_1$ indicated by $\rho_y$. A ratio between $\rho_x$ and $\rho_y$ is related to the size of the second transparent conductive layer 142. The larger the size of the second transparent conductive layer 142, the larger the ratio. If the second transparent conductive layer 142 has a rectangular structure, and the diagonal of the second transparent conductive layer 142 is less than 3.5 inches, the ratio between $\rho_x$ and $\rho_y$ is larger than or equal to 2; if the diagonal of the second transparent conductive layer 142 is larger than or equal to 3.5 inches, the ratio between $\rho_x$ and $\rho_y$ is larger than or equal to 5. In one embodiment, the second transparent conductive layer 142 is about 3.5 inches, and the ratio between $\rho_x$ and $\rho_y$ is about 10. A plurality of conductive passages defined between each detecting electrode 146 and the second electrode 144. The second electrode 144 is an input electrode, and the detecting electrodes are output electrodes.

The second transparent conductive layer 142 can be a carbon nanotube layer structure including a plurality of carbon nanotubes. The carbon nanotube layer structure can be a freestanding structure, that is, the carbon nanotube layer structure can support itself without a substrate. If at least one point of the carbon nanotube layer structure is held, the entire carbon nanotube layer structure can be lifted without being damaged. The plurality of carbon nanotubes in the carbon nanotube structure is substantially oriented along a same direction. In one embodiment, the carbon nanotube layer structure is a pure structure of carbon nanotubes. The carbon nanotube layer structure can include at least one carbon nanotube film. In one embodiment, the carbon nanotube structure can include at least two stacked carbon nanotube films or a plurality of carbon nanotube films contiguously positioned side by side, with the carbon nanotubes in the carbon nanotube films substantially oriented along the same direction.

Figure 5:
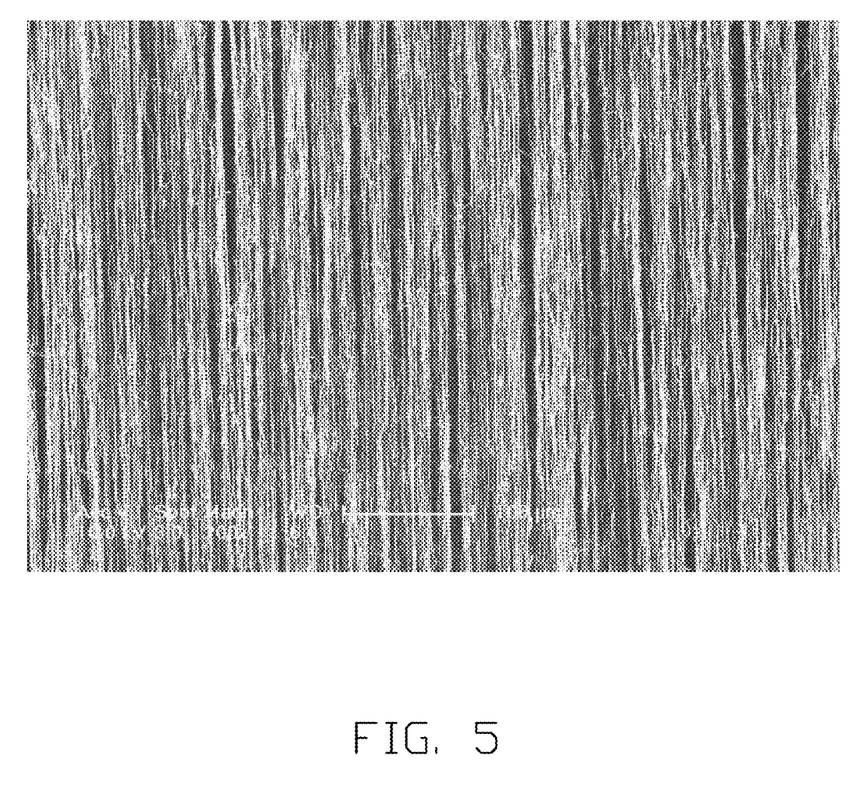
FIG. 5 shows a Scanning Electron Microscope image of a carbon nanotube film.

Referring to FIG. 5, the carbon nanotube film includes a number of successive and oriented carbon nanotubes joined end-to-end by van der Waals attractive force therebetween. The carbon nanotube film is a free-standing film. Each carbon nanotube film includes a number of successively oriented carbon nanotube segments joined end-to-end by Van der Waals attractive force therebetween. Each carbon nanotube segment includes a number of carbon nanotubes substantially parallel to each other, and joined by Van der Waals attractive force therebetween. Some variations can occur in the carbon nanotube film. The carbon nanotubes in the carbon nanotube film are oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 μm.

The carbon nanotubes in the carbon nanotube structure can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The lengths of the carbon nanotubes can range from about 200 μm to about 900 μm.

In one embodiment according to FIG. 4, the second transparent conductive layer 142 includes one layer of carbon nanotube film. The carbon nanotubes in the carbon nanotube film are substantially oriented along the second direction $Y_1$.

In use of the touch panel 10, the touch panel 10 is attached on a display device. When a user places a finger or other conductive object on the touch panel 10 at a touching point, without applying sufficient force to cause the first transparent conductive layer 122 and the second conductive layer 142 to contact each other, capacitive coupling occurs between the finger or conductive object and the first electrode plate 12, resulting in a signal detected by the capacitive detector 300. The capacitive detector 300 transfers the signal to the processor 400, and the processor 400 can open or close the display device. The capacitive detector 300 can detect the capacitive signal when the finger or other conductive object approaches the surface of the touch panel 10 and when contacting the touch panel 10 prior to sufficient force applied to the touch panel 10 to force the first transparent conductive layer 122 into contact with the second conductive layer 142. When a user places the finger or conductive object on the touch panel 10 at the touch point with sufficient force to cause the first transparent conductive layer 122 to contact the second conductive layer 142, the touch panel 10 can immediately perform as a normal resistive touch panel to detect the location of the touching point. The second electrode 124 is the input electrode inputting voltage signals, and the detecting electrodes 126 are the output electrodes outputting voltage signals. The location of the touch point can be detected by measuring a voltage of each detecting electrode 146 by the resistive touch panel detector 200. If there is a plurality of touching points, the detecting electrodes 146 can be used to detect the location of each touching point. The location of one touching point at the first direction $X_1$ can be detected by the corresponding detecting electrode 146. The location of the touching point at the second direction $Y_1$ can be detected by the voltage change of the detecting electrode 146, because a change of the voltage of the detecting electrodes 146 is related to a vertical distance between the touching point and the second electrode 142. As such, the location of the touching point can be detected. Because the conductive passages between each detecting electrode 146 and the second electrode 142 do not affect each other, the locations of a plurality of touching points can be detected at the same time.

The touch panel 10 disclosed in the present disclosure has a plurality of advantages. First, the touch of the touch panel 10 can be detected prior to contact with the touch panel 10. Thus, a signal can be sent to the processor for providing a timely response when the touch panel 10 is touched. For example, if the touch panel 10 is used on an LCD display screen, the LCD display screen can be turned off when the user puts the device near their face, for example, when a call is placed. Further, the LCD display screen can "wake up" if it is off when the object or finger approaches the portable electronic device. As such, the touch panel 10 has high reaction speed and high sensitivity. Second, the touch panel 10 has a simple structure and can detect multiple touching points at the same time. Third, because the second transparent conductive layer 142 of the touch panel 10 includes a carbon nanotube layer structure including a plurality of carbon nanotubes oriented along a same direction, the carbon nanotube structure has different resistances along different directions, and the touch panel 10 can detect multiple touching points at the same time without etching the second transparent conductive layer 142 or by any other complicated method, the touch panel has a low cost.

Figure 6:
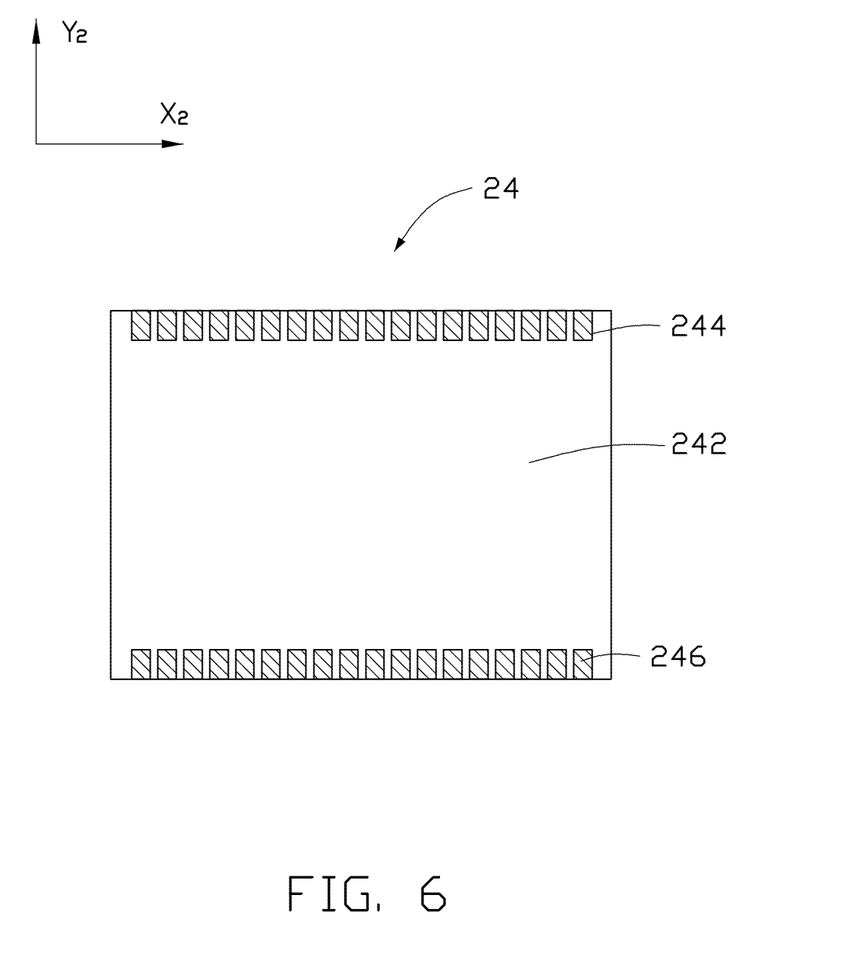
FIG. 6 is a schematic view of a first electrode plate used in a touch panel of another embodiment.

A touch panel according to another embodiment includes a first electrode plate (not shown) and a second electrode plate 24 having the structures as shown in FIG. 6. The first electrode plate has the same structure as that of the first electrode plate 12 disclosed above. The second electrode plate 24 includes a second transparent conductive layer 242, a plurality of first detecting electrodes 244, and a plurality of second detecting electrodes 246. The first detecting electrodes 244 and the second detecting electrodes 246 are electrically connected to the second transparent conductive layer 242. The first detecting electrodes 244 are located at one end of the second transparent conductive layer 242, and the second detecting electrodes 246 are located at another end of the second transparent conductive layer 242 opposite the second detecting electrodes 246. The first detecting electrodes 244 are arranged along a first direction $X_2$ as shown in FIG. 6. The second detecting electrodes 246 are also arranged along the first direction $X_2$. The first detecting electrodes 244 and the second detecting electrodes 246 are respectively aligned opposite to each other. A distance between adjacent first detecting electrodes 244 can be uniform, and in a range from about 1 micrometer to about 100 micrometers. A distance between adjacent second detecting electrodes 246 can be uniform, and in a range from about 1 micrometer to about 100 micrometers. A second direction $Y_2$ is perpendicular to the first direction. A resistivity of the second transparent conductive layer 242 along the first direction $X_2$ direction is larger than a resistivity along the second direction $Y_2$.

In one embodiment, the first detecting electrodes 244 can be used as input electrodes and the second detecting electrodes 246 can be used as output electrodes. In another embodiment, the first detecting electrodes 244 can be used as output electrodes and the second detecting electrodes 246 used as input electrodes. The method of using the touch panel is the same as the method of using the touch panel 10 disclosed above.

Other characteristics of the touch panel are the same as the touch panel 10 disclosed above.

Figure 7:
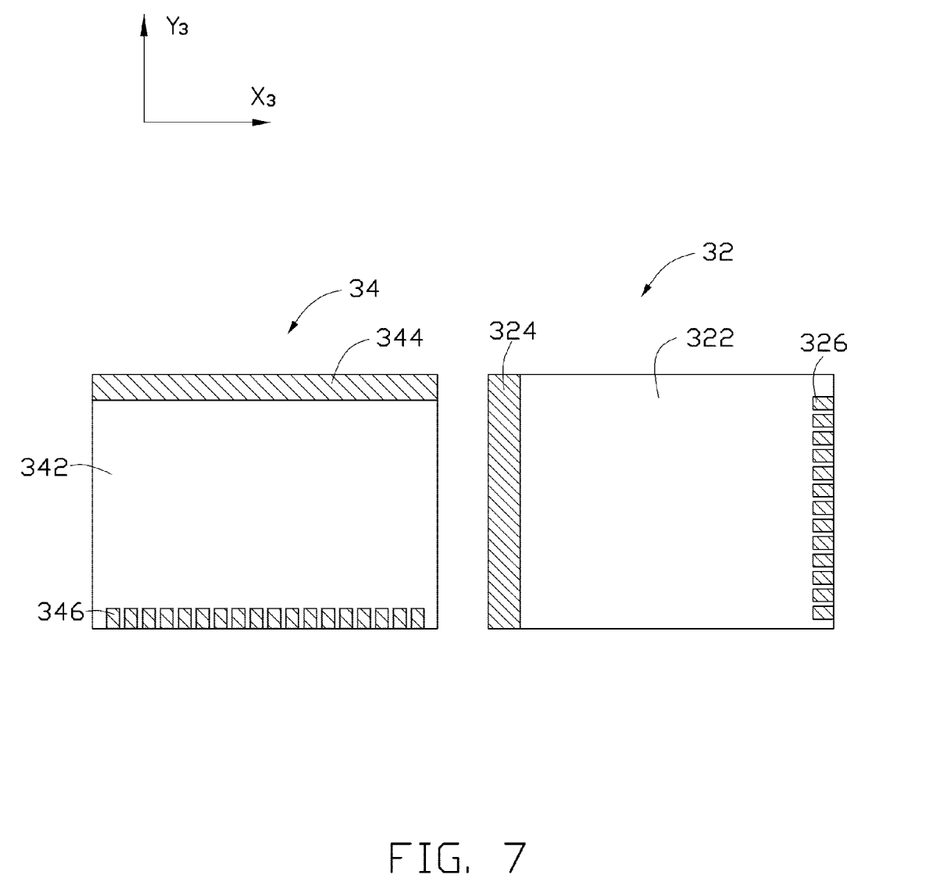
FIG. 7 is a schematic view of a first electrode plate and a second electrode used in a touch panel of still another embodiment.

A touch panel according to another embodiment includes a first electrode plate 32 and a second electrode plate 34 having the structures as shown in FIG. 7.

The second electrode plate 34 has the same structure as that of the second electrode plate 14 disclosed above and includes a second transparent conductive layer 342, a second electrode 344, and a plurality of second detecting electrodes 346. The second electrode 344 is oriented along a first direction $X_3$, as shown in FIG. 7. The second detecting electrodes 346 are arranged along the first direction. A second direction $Y_3$ perpendicular to the first direction is shown in FIG. 7. A plurality of conductive passages is formed on the second electrode plate 34 between the second electrode 344 and the second detecting electrodes 346.

The first electrode plate 32 includes a first transparent conductive layer 322, a first electrode 324, and a plurality of first detecting electrodes 326. The first electrode 324 is oriented along the second direction $Y_3$. The first detecting electrodes 326 are arranged along the second direction $Y_3$. A distance between adjacent first detecting electrodes 326 can be uniform, and in a range from about 1 micrometer to about 100 micrometers. The first transparent conductive layer 322 can be a conductive film having different resistances along different directions, e.g., the resistivity of the first transparent conductive layer 322 in two-dimensional space is different. A resistivity of the first transparent conductive layer 322 along the second direction $Y_3$ is larger than the resistivity along the first direction $X_3$. The first transparent conductive layer 322 can include the carbon nanotube layer structure disclosed above. The carbon nanotubes in the carbon nanotube layer structure are oriented along the first direction $X_3$. A conductive passage is formed between each first detecting electrode 326 and the first electrode 342, and a plurality of conductive passages is formed on the first electrode plate 32. The plurality of conductive passages on the first electrode plate 32 is substantially perpendicular to the conductive passages on the second electrode plate 34.

In use of the touch panel, low voltage is input into the touch panel via the first electrode 324 and the first detecting electrodes 326, high voltage is input via the second electrode 344, and the location along the first direction $X_3$ of a touching point can be detected by the second detecting electrodes 346. Low voltage is input into the touch panel via the second electrode 344 and the second detecting electrodes 346, high voltage is input via the first electrode 324, and the location along the second direction $Y_3$ of a touching point can be detected by the first detecting electrodes 326.

Other characteristics of the touch panel are the same as the touch panel 10 disclosed above.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A touch panel comprising:
   a first electrode plate comprising a first transparent conductive layer, wherein the first electrode plate further comprises a first electrode located at a surface of the first transparent conductive layer and superposed with four sides of the first conductive layer;
   a second electrode plate comprising a second transparent conductive layer opposite to and spaced from the first transparent conductive layer, the second transparent conductive layer having different resistivity along different directions, wherein a first resistivity of the second transparent conductive layer along a first direction is larger than a second resistivity along a second direction, that is substantially perpendicular with the first direction; the second electrode plate further comprises a second electrode located at one end of the second transparent conductive layer and a plurality of detecting electrodes located at another end of the second transparent conductive layer; the second electrode is linear and oriented substantially along the first direction, each of the plurality detecting electrodes is block shaped; and the plurality of detecting electrodes are arranged substantially along the first direction;
   a capacitive detector electrically connected with the first transparent conductive layer to detect a capacitive signal between the first transparent conductive layer and a touching object; and
   a resistive touch panel detector electrically connected with the second transparent conductive layer to detect a voltage signal between the first transparent conductive layer and the second transparent conductive layer, wherein the capacitive detector and the resistive touch panel detector are selected to perform work in response to force applied on the first electrode plate.

2. The display device of claim 1, wherein the second transparent detecting layer is a pure structure of carbon nanotubes, and the carbon nanotubes in the second transparent layer are joined end-to-end with each other and oriented substantially along the second direction.

3. The touch panel of claim 1, wherein the first electrode is electrically connected to the capacitive detector.

4. The touch panel of claim 1, wherein a resistivity of the first transparent conductive layer along the second direction is larger than a resistivity of the first transparent conductive layer along the first direction.

5. The touch panel of claim 1, wherein a ratio between the first resistivity and the second resistivity is larger than or equal to 2.

6. The touch panel of claim 1, wherein a ratio between the first resistivity and the second resistivity is larger than or equal to 5.

7. The touch panel of claim 1, wherein the second transparent conductive layer comprises a carbon nanotube layer structure comprising a plurality of carbon nanotubes substantially oriented along the second direction.

8. The touch panel of claim 7, wherein the carbon nanotube layer structure is a pure structure of carbon nanotubes.

9. The touch panel of claim 7, wherein the plurality of carbon nanotubes in the carbon nanotube layer structure are joined end-to-end with each other via Van der Waals attractive force.

10. The touch panel of claim 8, wherein the carbon nanotube layer comprises at least one carbon nanotube film comprising a plurality of successively oriented carbon nanotube segments joined end-to-end by Van der Waals attractive force therebetween, and each carbon nanotube segment includes a number of carbon nanotubes substantially parallel to each other and joined by Van der Waals attractive force therebetween.

* * * * *